July 4, 1933. H. G. BUTT 1,916,556
CLAMP
Filed June 24, 1932
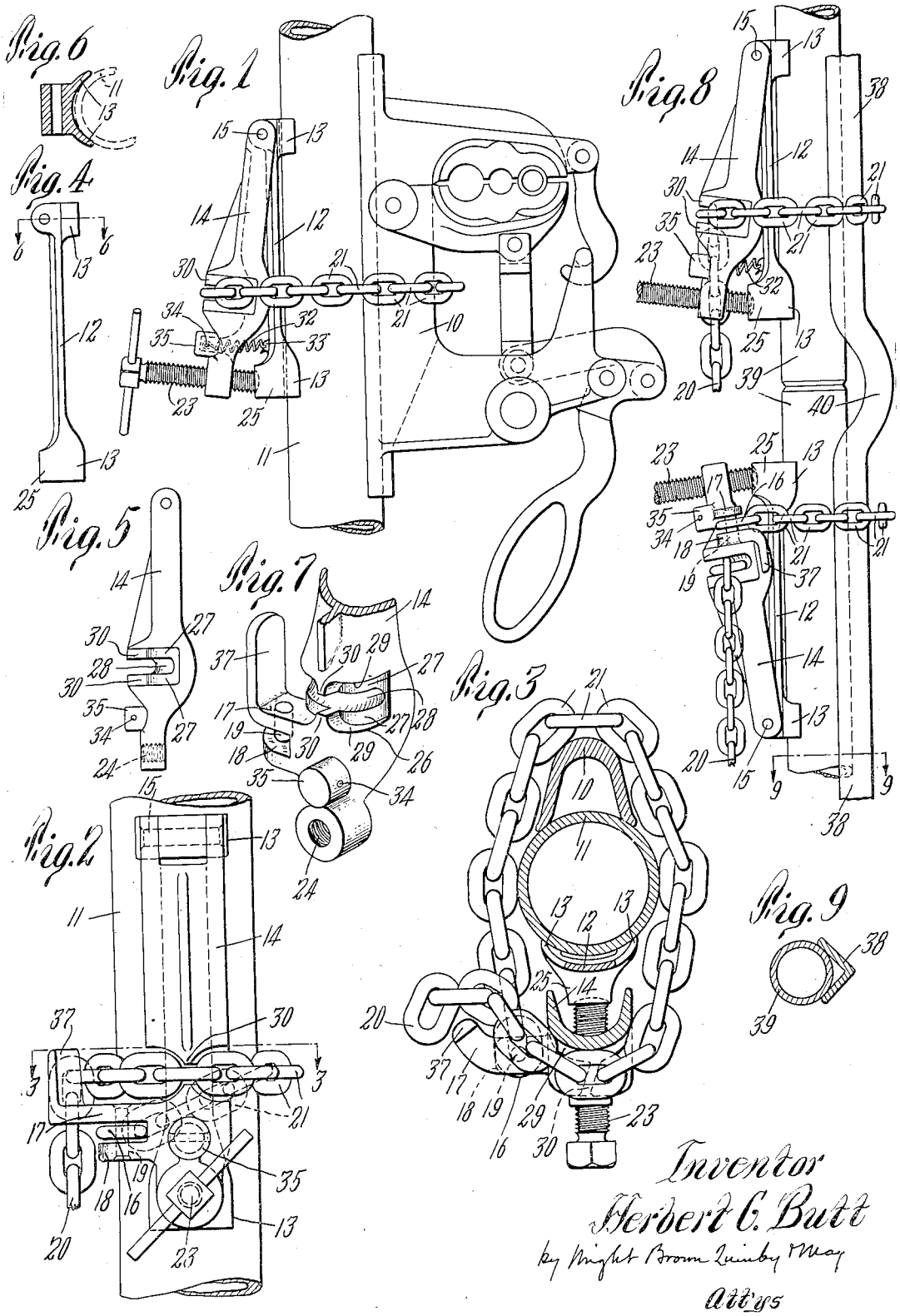
Inventor
Herbert G. Butt Patented July 4, 1933

1,916,556

UNITED STATES PATENT OFFICE

HERBERT G. BUTT, OF WINTHROP, MASSACHUSETTS

CLAMP

Application filed June 24, 1932. Serial No. 619,045.

This invention is embodied in a simple and conveniently operable clamp which includes a jaw formed to bear on one of two contacting bodies, a straining member movably connected with said jaw, and provided with a clutch part, an elongated flexible inextensible ligature fixed at one end to the straining member and elsewhere free to be manually wrapped around said bodies and the straining member, and thereby form a girdle portion contacting with one of the bodies and with said member, said ligature having a configuration adapting it to be interlocked with the clutch part of the straining member to render the girdle portion inextensible, and means for exerting pressure on the straining member to strain the girdle and cause it to cooperate with the jaw in forcibly binding said bodies together.

The chief use for which my improved clamp is intended, is to bind a pipe vise base constituting one of said bodies against a cylindrical member constituting the other body. As hereinafter stated the clamp may be otherwise used.

Of the accompanying drawing forming a part of this specification,—

Figure 1 is an edge view of a clamp embodying the invention, and shows as the bodies connected thereby, an upright standard and a pipe vise base.

Figure 2 is a side view of the clamp, and shows a portion of the standard.

Figure 3 is a section on line 3—3 of Figure 2, and a top view of parts below said line.

Figure 4 is an edge view of the jaw.

Figure 5 is an edge view of the straining member.

Figure 6 is a section on line 6—6 of Figure 4.

Figure 7 is a fragmentary perspective view showing an end portion of the straining member.

Figure 8 is a view illustrating a different use of the clamp.

Figure 9 is a section on line 9—9 of Figure 8.

The same reference characters indicate the same parts in all of the figures.

In Figures 1, 2 and 5 of the drawing, 10 is the base of a pipe vise, the later being, in this instance, of the type shown by my Patent No. 1,623,045, dated April 5, 1927, the base being formed to be seated either on the flat surface of a bench, or on the cylindrical surface of a body 11, which may be either horizontal or vertical. My improved clamp is adapted to secure the vise to the body 11, as shown by Figures 1, 2 and 3.

The clamp includes a jaw 12 formed to bear on one side of the body 11, said jaw being preferably elongated and provided at each of its end portions with gripping members 13 adapted to bear on spaced apart portions of said body as shown by Figure 6.

14 designates a straining member movably connected with the jaw, as by a pivot stud 15 connecting one end of said member with a corresponding end of the jaw, the member 14 having a free end portion movable toward and from the jaw.

The straining member 14 is provided with a clutch part formed to be interlocked with a ligature which is convertible into an inextensible girdle embracing the straining member and the bodies 10 and 11.

The ligature is flexible and inextensible, and has a configuration adapting it to be interlocked with said clutch part, the latter having a complemental configuration. The ligature is preferably a metal chain whose links are of the type shown by the drawing. An end link 16 of the chain is fixed to the straining member by anchoring means preferably embodied in spaced apart ears 17 and 18 formed on said member, and a pin 19 inserted in said ears and extending through the link 16. The opposite end link of the chain is designated by 20. The length of the chain is such that it is adapted to be wrapped around the straining member 14, and the bodies 10 and 11, and interlocked with the clutch part to provide the chain with an inextensible girdle portion, designated by 21, bearing on the straining member 14 and on the body 10.

The clutch part of the member 14 as here shown is formed by the walls of a recess 26 between the ends of said member, and is located close to the described anchoring means. Said recess has a curved wall 27 (Figure 7) including a groove 28, and side walls 29 including oppositely projecting lugs 30.

As shown by Figure 3 the inner sides of some of the links forming the girdle portion 21, conform to the curved bottom 27 and enter the groove 28. As shown by Figure 2 the lugs 30 project into spaces between the ends of two contiguous links connected by an intermediate link. The recess walls are therefore interlocked with said links so that the ligature cannot slip on the straining member.

The clamp includes means for forcibly adjusting the straining member 14 outward from the jaw 12, and maintaining it in any adjusted position to strain the girdle portion 21 and cause it to cooperate with the jaw in forcibly binding the bodies 10 and 11 together. I prefer to embody said means in a screw 23 engaged with an internal thread 24 (Figure 7) in the straining member, and bearing loosely on an abutment 25 on one end of the jaw 12.

When the body 10 is applied to one side of the body 11 and the jaw 12 is applied to the opposite side, the ligature is manually wrapped around the straining member and the said bodies, and engaged with the clutch part of the straining member to form the girdle portion, which is now somewhat loose because the operator's muscular force is not sufficient to cause the necessary binding pressure of the girdle portion on the parts with which it contacts. The adjusting screw 23 is then operated to adjust the straining member 14 outward from the jaw 12 and thus strain the girdle portion and cause it to forcibly bind the bodies 10 and 11 together.

The clutch part of the straining member 14 is located as above stated between the ends of the lever. The arrangement is such that when the girdle portion is strained it exerts substantially equal pressure through the straining member 14 on the gripping members 13 of the jaw, so that said gripping members oppose endwise displacement of the jaw relative to the body or standard 11 thus preventing any liability of the clamp as a whole to slip downwardly on the standard when the latter is vertical.

The ligature has a surplus free end portion which includes the end link 20, when the ligature is a chain, and constitutes a handle portion whereby the ligature may be grasped and manipulated to form the girdle portion.

To normally confine the straining member 14 in yielding contact with the jaw 12 and thus prevent said member from swinging loosely when the clamp is not in use, or is being prepared for use, I provide a contractile spring 32 (Figure 1), attached at one end to an ear 33 on the jaw, and at its other end to a pin 34 in a hollow boss 35 formed on the lever.

The ear 17 (Figure 7), may be provided with an upstanding finger 37 with which the free end portion of the ligature may be engaged to prevent it from dangling objectionably.

The straining member may be constructed and arranged in any suitable manner to function as above described. In the preferred embodiment here shown the straining member is substantially coextensive in length with the jaw 12, and is connected at one end with an end of the jaw by the pivot 15 which constitutes a fulcrum stud on which the straining member swings.

The internal screw thread 24 is formed in the swinging end of the straining member, and the clutch part of said member is located between the stud 15 and the internal screw thread. The torque of the screw 23 is therefore advantageously exerted in straining the girdle portion of the ligature.

Figures 8 and 9 illustrate another use of the described clamp, two of said clamps being employed to bind together an elongated clamping bar 38 and two lengths 39 of metal pipe, the meeting ends of which are abutted together preparatory to being united by a welding operation. The bar 38 is angular in cross section as shown by Figure 9, and thus adapted to hold the pipe lengths in alinement with each other. Said bar bridges the joint formed by the meeting ends of the pipe lengths, and may have an offset bridge portion 40 permitting the welding operation to extend around the meeting ends of the pipe lengths.

I claim:

1. A clamp adapted to bind two bodies together, said clamp comprising a jaw formed to bear on one of said bodies, a straining member movably connected with the jaw and having a clutch part, an elongated inextensible ligature having a configuration adapting it to be interlocked with said clutch part, the ligature being fixed at one end to the straining member, and having a free portion adapted to be wrapped around said bodies and interlocked with said clutch part to provide the ligature with an inextensible girdle portion bearing on the straining member and on the other of said bodies, and means for forcibly adjusting the straining member outward from the jaw and maintaining it in any adjusted position, to strain said girdle portion and cause it to forcibly bind said bodies together.

2. A clamp adapted to bind two bodies together, said clamp comprising an elongated jaw having gripping members at its opposite ends bearing on spaced apart portions of one of said bodies, an elongated straining member pivoted at one end to an end of the jaw, an end portion of said member being movable toward and from the jaw, and provided between its ends with a clutch part, an elongated inextensible ligature having a configuration adapting it to be interlocked with said clutch part, the ligature being fixed at one end to the straining member, and having a free portion adapted to be wrapped around said bodies and interlocked with the clutch part to provide the ligature with an inextensible girdle portion bearing on the straining member and on the other of said bodies, and means for forcibly adjusting the straining member outward from the jaw and maintaining it in any adjusted position to strain said girdle portion, the arrangement being such that the strained girdle portion exerts substantially equal pressure through said straining member on the gripping members of the jaw to oppose endwise displacement of the jaw relative to the body on which it bears.

3. A clamp adapted to bind two bodies together, said clamp comprising a jaw formed to bear on one of said bodies, a straining member movably connected with the jaw and having a clutch part, an elongated inextensible ligature having a configuration adapting it to be interlocked with said clutch part, the ligature being fixed at one end to the straining member, and having a free portion adapted to be wrapped around said bodies and interlocked with the clutch part to provide the ligature with an inextensible girdle portion bearing on said member and on the other of said bodies, the clamp comprising also a screw engaged with an internal screw thread in the straining member and bearing loosely on an abutment on the jaw, whereby said member may be adjusted outward from the jaw and maintained in any adjusted position to strain the girdle portion and cause it to forcibly bind said bodies together.

4. A clamp as specified by claim 1, said straining member having anchoring means adjacent its clutch part, whereby one end of the ligature is fixed to the straining member.

5. A clamp as specified by claim 1, the ligature being an elongated chain, the clutch part being formed by the walls of a recess in the lever formed to receive links of the chain, said walls being formed to be interlocked with said links.

6. A clamp as specified by claim 1, the ligature being an elongated chain, the clutch member being formed by the walls of a recess in the straining member formed to receive links of the chain, said walls including a curved bottom wall, and side walls having oppositely projecting lugs, said walls being formed to be interlocked with said links.

7. A clamp as specified by claim 1, said ligature having a surplus free end portion constituting a handle whereby the ligature may be manipulated to form said girdle portion.

8. A clamp as specified by claim 1, comprising also a contractile spring connecting an end portion of the straining member with an end portion of the jaw, and arranged to normally hold said member yieldingly against said jaw.

9. A clamp as specified by claim 3, said straining member being substantially coextensive in length with the jaw and connected at one end with an end of the jaw by a fulcrum stud and provided at its opposite end with the internal screw thread with which said adjusting screw is engaged, the clutch part of the straining member being located between the fulcrum stud and the internal screw thread.

In testimony whereof I have affixed my signature.

HERBERT G. BUTT.